(12) United States Patent
P et al.

(10) Patent No.: US 11,047,274 B2
(45) Date of Patent: Jun. 29, 2021

(54) AIR-OIL SEPARATOR

(71) Applicant: GM GLOBAL TECHNOLOGY OPERATIONS LLC, Detroit, MI (US)

(72) Inventors: Selvaganesh P, Munnekolal (IN); Omesh Reshi, Bengaluru (IN); Jonathan C. Laursen, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 246 days.

(21) Appl. No.: 16/190,587

(22) Filed: Nov. 14, 2018

(65) Prior Publication Data
US 2020/0149448 A1 May 14, 2020

(51) Int. Cl.
| | | |
|---|---|---|
| *F01M 13/04* | (2006.01) |
| *B01D 45/08* | (2006.01) |
| *B01D 46/00* | (2006.01) |
| *B01D 50/00* | (2006.01) |
| *F02M 35/04* | (2006.01) |

(Continued)

(52) U.S. Cl.
CPC .............. *F01M 13/04* (2013.01); *B01D 45/08* (2013.01); *B01D 46/0027* (2013.01); *B01D 50/002* (2013.01); *F02M 35/024* (2013.01); *F02M 35/044* (2013.01); *F02M 35/10006* (2013.01);
(Continued)

(58) Field of Classification Search
CPC .......... F01M 13/04; F01M 2013/0433; F01M 13/0416; F01M 2013/0461; B01D 45/08; B01D 46/0027; B01D 50/002; B01D 2279/60; F02M 35/044; F02M 35/10006; F02M 35/10222; F02M 35/024
See application file for complete search history.

(56) References Cited

U.S. PATENT DOCUMENTS 4,627,406 A * 12/1986 Namiki .................. F02M 25/06
123/573
5,487,371 A * 1/1996 Beckman ............... F02M 25/06
123/572
(Continued)

FOREIGN PATENT DOCUMENTS

CN 104033209 A 9/2014

OTHER PUBLICATIONS

First Chinese Office Action for Application No. 2019104461118; Office Action dated May 8, 2021; Office Action Received: May 11, 2021; 11 pages.

*Primary Examiner* — Hung Q Nguyen
(74) *Attorney, Agent, or Firm* — Cantor Colburn LLP (57) ABSTRACT

An engine assembly includes an engine, an intake assembly, and an air-oil separator. The engine defines a combustion chamber and a crankcase. The intake assembly includes an intake manifold wherein the intake manifold is in fluid communication with the combustion chamber. The air-oil separator defines an internal passageway having a separator volume and further defining an inlet and outlet in fluid communication with the separator volume. The inlet of the air-oil separator may be in fluid communication with the crankcase while the outlet of the air-oil separator may be in fluid communication with the intake manifold. The air-oil separator further includes a fine separator disposed across the internal passageway proximate to the inlet wherein the fine separator includes a curved backplate and a front plate.

15 Claims, 5 Drawing Sheets

(51) Int. Cl.
*F02M 35/10* (2006.01)
*F02M 35/024* (2006.01)

(52) U.S. Cl.
CPC ... *F02M 35/10222* (2013.01); *B01D 2279/60* (2013.01); *F01M 2013/0433* (2013.01)

(56) References Cited

U.S. PATENT DOCUMENTS

| | | | |
|---|---|---|---|
| 5,562,087 | A | 10/1996 | Wright |
| 5,617,834 | A | 4/1997 | Lohr |
| 6,065,457 | A * | 5/2000 | Hoffmann .......... F01M 13/0416 123/572 |
| 8,408,190 | B2 | 4/2013 | Spix et al. |
| 10,286,347 | B2 * | 5/2019 | Meister ................. B01D 45/08 |
| 10,661,210 | B2 * | 5/2020 | Meister-Place ...... B01D 50/002 |
| 2006/0054123 | A1 * | 3/2006 | Stein ..................... F01M 13/04 123/90.38 |
| 2009/0101124 | A1 * | 4/2009 | Mochida ................ F01M 13/02 123/572 |
| 2012/0297980 | A1 * | 11/2012 | Slaughter .............. B01D 45/08 95/272 |

* cited by examiner

AIR-OIL SEPARATOR

TECHNICAL FIELD

The present disclosure relates to a crankcase ventilation system for an internal combustion engine, and more particularly to an air-oil separator for removing entrained oil from crankcase blowby gases.

BACKGROUND

When the air-fuel mixture in the combustion chamber of an internal combustion engine is ignited, a portion of the burnt gas during the power stroke leaks between the piston and the cylinder wall into the crankcase. The need to remove this gas, commonly referred to as blowby gas, from the engine crankcase is well known. Otherwise, the blowby gas would deteriorate the quality of the lubricating oil in the crankcase and also tend to increase crankcase pressure, thereby inducing oil leakage from the crankcase. Generally, the blowby gas is vented out of the crankcase and returned to the combustion chamber through the crankcase ventilation system. However, any excess oil entrained in the blowby gas must be removed prior to introducing the blowby gas to the combustion chamber. In an effort to ventilate the crankcase and re-circulate the blowby gas to the intake side of the engine, a positive crankcase ventilation (PCV) system may be used.

SUMMARY

The present disclosure provides an engine assembly which better separates oil from the crankcase blowby gases. In one embodiment, the engine assembly includes an engine, an intake assembly, and an air-oil separator. The engine defines a combustion chamber and a crankcase. The intake assembly includes an intake manifold wherein the intake manifold is in fluid communication with the combustion chamber. The air-oil separator defines an internal passageway having a separator volume and further defining an inlet and outlet in fluid communication with the separator volume. The inlet of the air-oil separator may be in fluid communication with the crankcase while the outlet of the air-oil separator may be in fluid communication with the intake manifold. The air-oil separator further includes a fine separator disposed across the internal passageway proximate to the inlet wherein the fine separator includes a curved backplate and a front plate.

The aforementioned curved backplate includes a curved surface which is disposed across from (faces) the front plate. The opposite side of the curved backplate which faces away from the front plate may or may not define a curved surface. The front plate of the fine separator defines at least one aperture or a plurality of apertures configured to redirect and evenly distribute the blowby gases against the curved surface of the curved backplate. Once the blowby gases are directed against the curved surface of the curved backplate, the blowby gases flow are then redirected around the curved surface of the curved backplate thus causing oil to separate from the blowby gases. The oil which has been separated by the blowby gases may then drain back into the crankcase. It is understood that the front plate extends across the internal passageway and the curved backplate may partially extend from an interior surface of the internal passageway into the separator volume.

In the aforementioned embodiment, the engine may further include an engine block, a cylinder head, an oil pan, and a cylinder head cover wherein the air oil separator is disposed between the cylinder head and cylinder head cover. Moreover, the intake assembly may include a throttle in communication with the intake manifold wherein the throttle is configured to selectively control air flow into the intake manifold. The intake assembly may also optionally include an air filter in fluid communication with and located upstream of the throttle. Optionally, a breather tube may be fluidly coupled with the intake assembly and with the crankcase. The breather tube may be operative to allow air to pass from the intake assembly into the crankcase. The aforementioned breather tube may include a check valve operative to restrict air from passing from the crankcase into the intake assembly. It is also understood that the internal passageway of the air-oil separator may also optionally include a bypass valve operative to restrict air from passing from the crankcase into the intake assembly when blowby gas pressure exceeds a predetermined threshold. The air-oil separator may also include a baffle at least partially extending from the interior surface of the internal passageway into internal passageway. The internal passageway may have a convoluted configuration wherein multiple curved surfaces or bends are formed in the internal passageway.

In another embodiment of the present disclosure, the engine assembly may include an engine, an intake assembly, and an air-separator. The engine may include an engine block, a cylinder head, an oil pan, and a cylinder head cover, the engine block and oil pan partially defining a crankcase. The intake assembly may include an intake manifold which may be in fluid communication with the combustion chamber. The air-oil separator may be disposed between the cylinder head and cylinder head cover. The air-oil separator may define an internal passageway which defines a separator volume. The air-oil separator may further include an inlet, an outlet and a fine separator disposed across the internal passageway proximate to the inlet wherein the fine separator is formed by a curved backplate and a front plate. The inlet and outlet may be in fluid communication with the separator volume or internal passageway. The inlet of the air-oil separator maybe in fluid communication with the crankcase while the outlet of the air-oil separator may be in fluid communication with the intake manifold. The aforementioned curved backplate includes a curved surface which is disposed across from (faces) the front plate. The opposite side of the curved backplate which faces away from the front plate may or may not define a curved surface. The front plate of the fine separator defines at least one aperture or a plurality of apertures configured to redirect and evenly distribute the blowby gases against the curved surface of the curved backplate. Once the blowby gases are directed against the curved surface of the curved backplate, the blowby gases flow are then redirected around the curved surface of the curved backplate thus causing oil to separate from the blowby gases. The oil which has been separated by the blowby gases may then drain back into the crankcase. It is understood that the front plate extends across the internal passageway and the curved backplate may partially extend from an interior surface of the internal passageway into the separator volume.

With respect to the aforementioned embodiment, a breather tube may be fluidly coupled with the intake assembly and with the crankcase. The aforementioned breather tube may be operative to allow air to pass from the intake assembly into the crankcase. Moreover, the breather tube may include a check valve operative to restrict air from passing from the crankcase into the intake assembly. It is also understood that the internal passageway of the air-oil separator may also optionally include a bypass valve operative to restrict air from passing from the crankcase into the intake assembly when blowby gas pressure exceeds a predetermined threshold. The air-oil separator of the aforementioned embodiment may also optionally include a baffle at least partially extending from the interior surface of the internal surface into the internal passageway.

In yet another embodiment of the present disclosure, a method of separating oil from engine blowby gas includes the steps of: (1) venting blowby gas from the crankcase of an engine and into an air-oil separator via an inlet of the air-oil separator; (2) flowing the blowby gas through an internal passageway defined by the air-oil separator and through a fine separator having a curved back plate; and (3) venting the blowby gas from the internal passageway into an intake manifold of the engine via an outlet of the air-oil separator. It is understood that the fine separator may be disposed across the internal passageway (which may be optionally proximate to the inlet), the fine separator being formed by a curved backplate and a front plate with an aperture (or a plurality of apertures) configured to direct the blowby gas flow against a curved surface of the curved backplate (and then around) the curved backplate in order to separate oil from the blowby gas. The plurality of apertures defined in the front plate substantially distributes the blowby gas across the curved surface of the curved backplate.

Accordingly, the aforementioned step of flowing the blowby gas through an internal passageway includes redirecting the air through at least one aperture defined in the front plate and against a curved backplate wherein the front plate extends across the internal passageway and the curved backplate partially extends from an interior surface of the internal passageway into the internal passageway. With respect to the aforementioned method, it is understood that the curved backplate includes a curved surface which is disposed across from (faces) the front plate. (The opposite side of the curved backplate which faces away from the front plate may or may not define a curved surface.) The front plate of the fine separator defines at least one aperture or a plurality of apertures configured to redirect and evenly distribute the blowby gases against the curved surface of the curved backplate. Once the blowby gases are directed against the curved surface of the curved backplate, the blowby gases flow are then redirected around the curved surface of the curved backplate thus causing oil to separate from the blowby gases. The oil which has been separated by the blowby gases may then drain back into the crankcase. It is understood that the front plate extends across the internal passageway and the curved backplate may partially extend from an interior surface of the internal passageway into the separator volume.

The engine implemented in the aforementioned method includes an engine block, a cylinder head, an oil pan, and a cylinder head cover wherein the air-oil separator is disposed between the cylinder head and cylinder head cover.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and the comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 1:
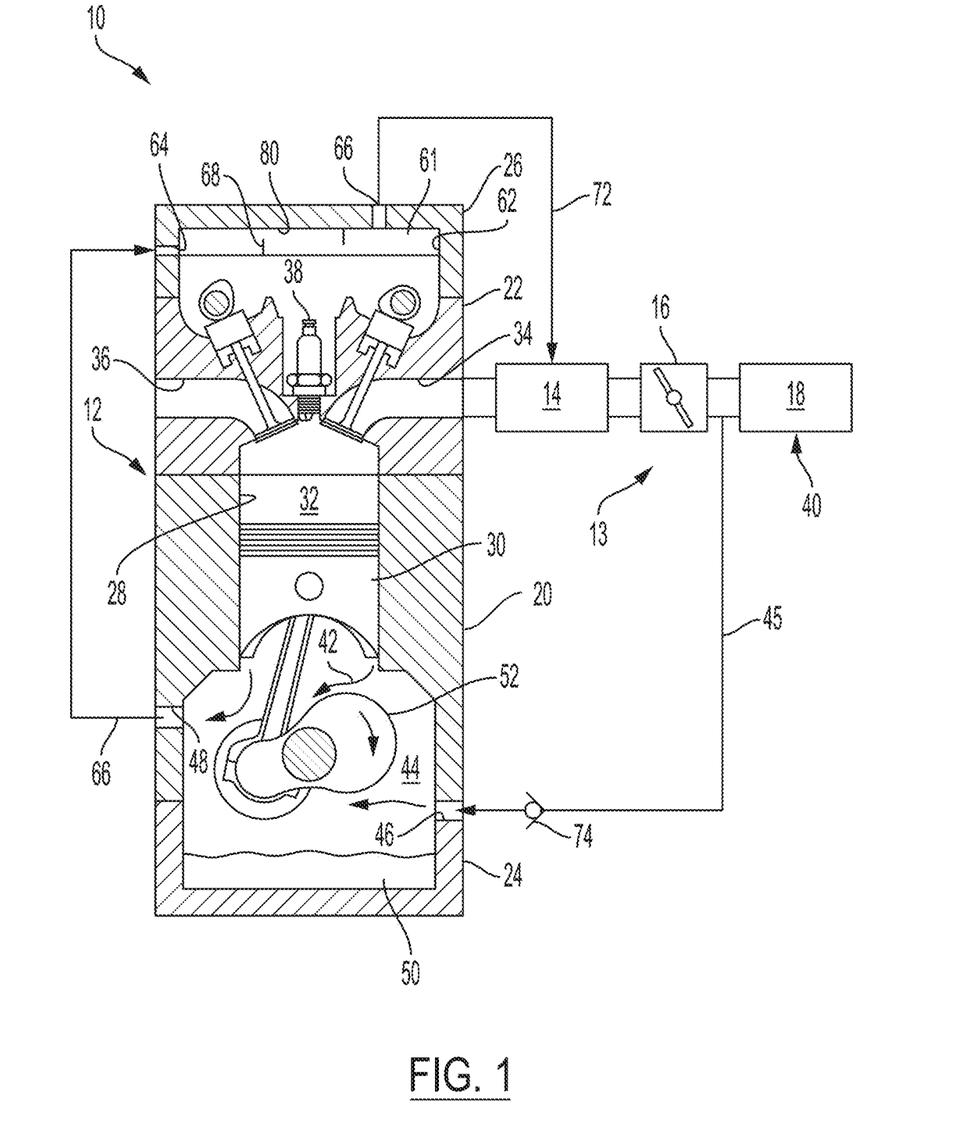
FIG. 1 illustrates a schematic cross-sectional view of the present disclosure.
Figure 2:
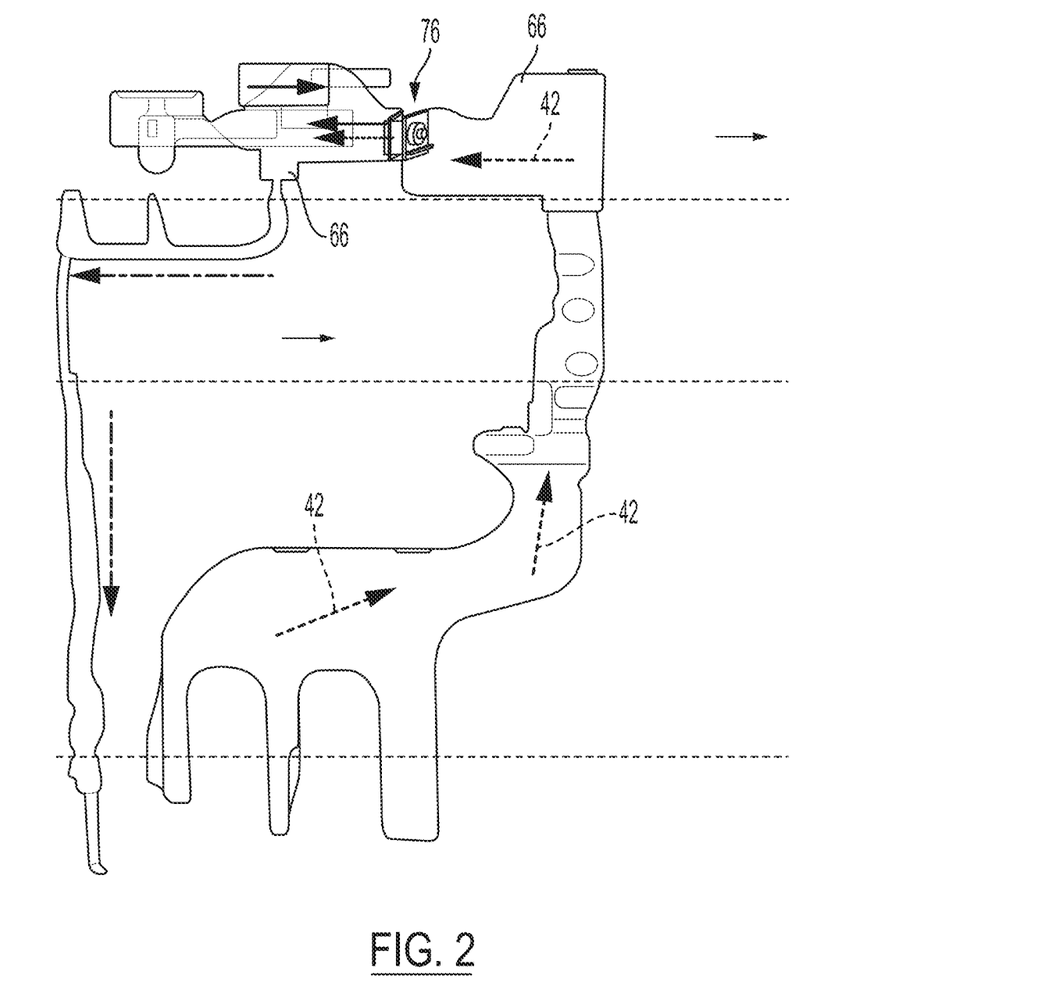
FIG. 2 illustrates a second schematic view of the present disclosure.

Referring to the drawings, wherein like reference numerals are used to identify like or identical components in the various views, FIG. 1 schematically illustrates an engine assembly 10 that may include an engine 12, and an intake assembly 13. The intake assembly 13 may include, for example, an intake manifold 14, a throttle 16, and air filter 18, with the throttle 16 being configured to selectively control air flow between the air filter 18 and the intake manifold 14. The engine 12 may include an engine block 20, a cylinder head 22, an oil pan 24, and an engine cylinder head cover 26. The engine block 20 may define a plurality of cylinder bores 28 (one of which is shown), with each cylinder bore 28 having a reciprocating piston 30 disposed therein. The plurality of cylinder bores 28 may be arranged in any suitable manner, such as, without limitation, a V-engine arrangement, an inline engine arrangement, and a horizontally opposed engine arrangement, as well as using both overhead cam and cam-in-block configurations.

The cylinder head 22 and engine block 20 and reciprocating piston 30 may cooperate to define a combustion chamber 32 for each respective cylinder bore 28. Additionally, the cylinder head 22 may provide one or more intake passages 34 and exhaust passages 36 that are in selective fluid communication with a combustion chamber 32. The intake passage 34 may be used to deliver an air/fuel mixture to the combustion chamber 32 from the intake manifold 14. Following combustion of the air/fuel mixture (such as when ignited by a spark from a spark plug 38), the exhaust passage 36 may carry exhaust gases out of the combustion chamber 32.

During engine operation, an intake stroke of the piston 30 may draw intake air 40 through the air filter 18, throttle 16, intake manifold 14 and intake passage 34 and into the combustion chamber 32. During the power stroke of the piston 30, following the ignition of the air/fuel mixture, a portion of the combustion gas may pass between the piston 30 and the engine block 20 (i.e., blowby gas 42) and into the crankcase 44 (the crankcase 44 being generally defined by the oil pan 24 and engine block 20). Because the blowby gas 42 includes an amount of un-burnt fuel and products of combustion, it may be desirable to avoid having these gases accumulate within the crankcase 44. Accordingly, intake air 40 (following filtration via the air filter 18) may be provided via a breather tube 45 coupled with the crankcase inlet port 46 to purge the blowby gas 42 from the crankcase 44. The intake air 40 and blowby gas 42 within the crankcase 44 may then be exhausted via a crankcase outlet port 48.

Due to engine vibrations, motion of the vehicle, the reciprocal motion of the piston 30, and/or the rotating motion of the crankshaft 52, oil 50 maintained within the crankcase 44 may be splashed, foamed, atomized, misted and/or sprayed within the entire volume of the crankcase 44. This atomized/particulated oil 50 may then be drawn out of the crankcase 44 via the crankcase outlet port 48 along with the intake air 40 and blowby gas 42. To prevent this oil from being drawn into the intake manifold 14 and back into the combustion chamber 32, the vented blowby gas 42 may be passed through an air-oil separator 62, which may be specially configured to separate and remove the oil 50 from the flowing gas. The air-oil separator 62 may define a separator volume 61, and may further define an inlet 64, and at least one outlet 66 that are each in fluid communication with the separator volume 61. The air-oil separator 62 may be located proximate or within the engine 12, such as, for example, within the cylinder head cover 26. In an embodiment, the air-oil separator 62 may comprise a cast aluminum or injection molded component, and may be disposed within a volume defined by the cylinder head cover 26. In another embodiment, the air-oil separator 62 may be a fully integrated portion of the cylinder head cover 26. In still another embodiment, the air-oil separator 62 may be located apart from the cylinder head cover 26, such as within the crankcase 44, within the cylinder head 22, or external to the engine 12.

The inlet 64 to the air-oil separator 62 may be in fluid communication with the crankcase outlet port 48, such as through a suitable channel or tube 66. The channel or tube 66 may be, for example, a bore or channel within the engine 12, or may be, for example, a heat resistant tube that extends between the crankcase 44 and separator inlet 64. The one or more outlets 64 may be in fluid communication with the air intake assembly 13, to allow the blowby gas 42 of the crankcase 44 to re-enter the engine 12 via the intake manifold 14.

Figure 3:
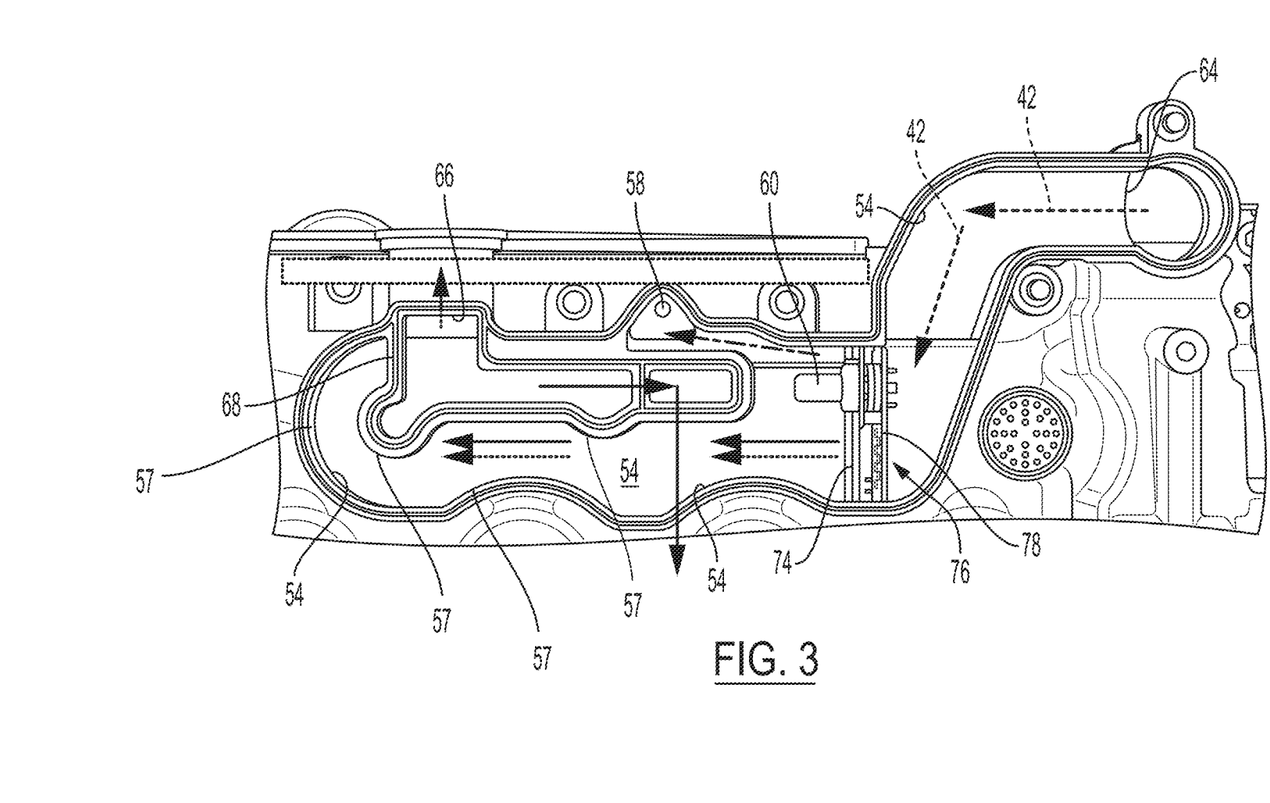
FIG. 3 illustrates a plan view of an embodiment of the air-oil separator of the present disclosure (with the cover removed).
Figure 4:
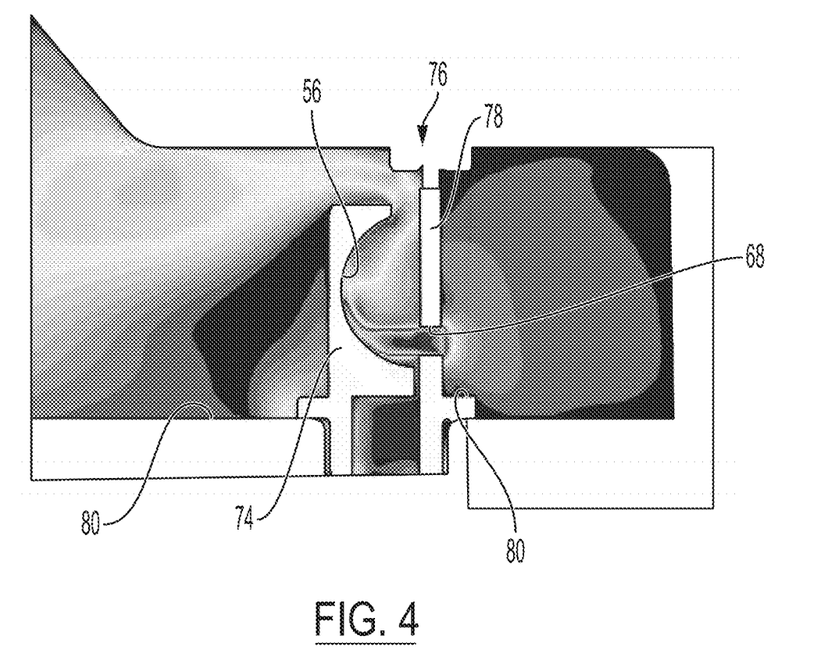
FIG. 4 illustrates a schematic cross-sectional view of fine particle separator as the blowby gas moves through the fine particle separator and the internal passageway.
Figure 5:
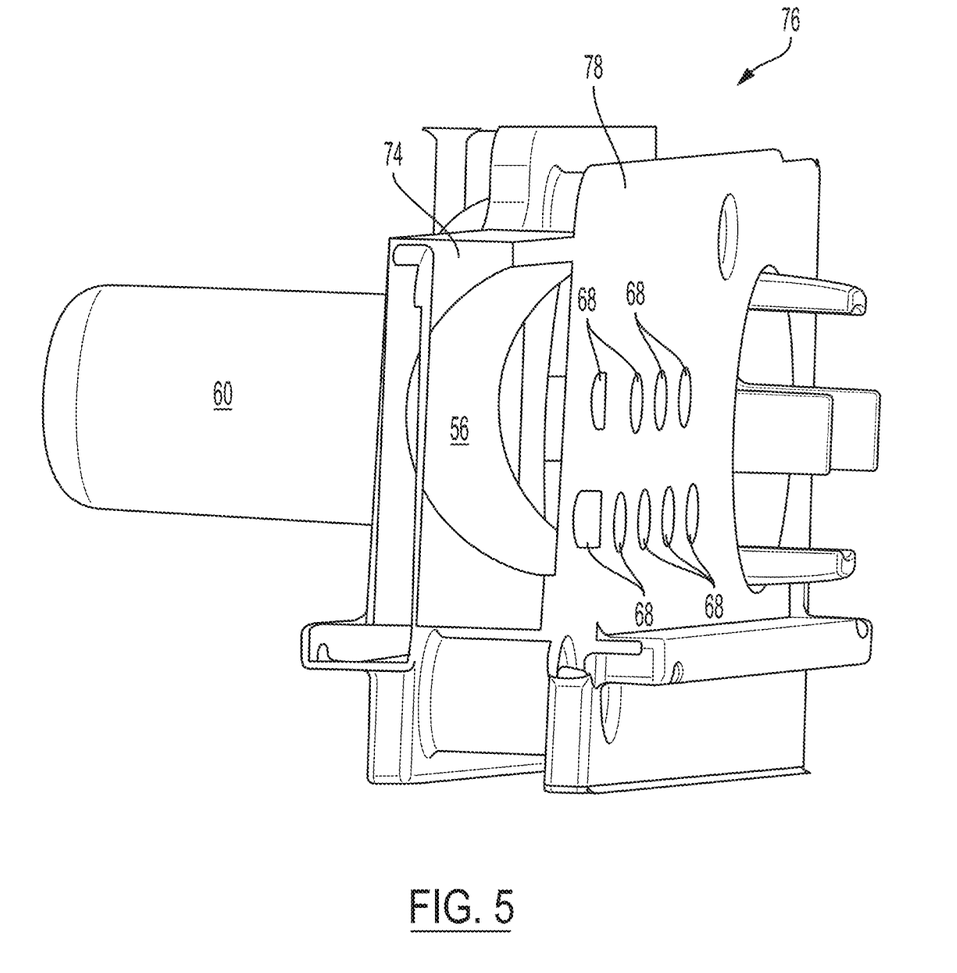
FIG. 5 illustrates an isometric view of the fine particle separator.

The air-oil separator 62 may include one or more drains (See FIG. 3) that may allow oil that is extracted from the passing air to flow back into the crankcase 44. The separator 62 may further include one or more upstanding baffles (e.g., baffle 68) or fins that may aid in separating the oil from the air, such as through flow redirection, or by creating a varying pressure along the flow path. As such, the inertia of the particulated oil 50 may cause the oil 50 to collide with one of the baffles 68 or walls of the separator 62. Once in contact with the wall, the surface tension of the oil 50 may cause it to cling to the wall, and may subsequently run off (via gravity) toward a drain. While the air-oil separator 62 are schematically illustrated in FIGS. 1 and 3 as having only a single internal passageway (or chamber), in practice, the separator 62 may include a plurality of internal passageways (or chambers) that may be joined by various flow-restricting and/or flow expanding features.

During operation, the engine 12 may generate a vacuum pressure in the intake manifold 14 when the throttle 16 partially blocks the intake air flow 40. This vacuum pressure may draw the blowby gas 42 from the crankcase 44 through the air-oil separator 62, and into the intake manifold 14. The intake manifold 14 may be coupled with the outlet 66 of the separator 62 through a corresponding vent line 72. To prevent the blowby gas 42 from directly entering the air intake system, such as during wide open throttle conditions where no significant pressure gradient exists across the throttle 16, a check valve 74 may be provided in the breather tube or a bypass valve 60 may be provided in internal passageway 54 of the air-oil separator 62. As shown in FIG.

3, the internal passageway 54 of the air-oil separator 62 may also optionally include a bypass valve 60 operative to restrict air from passing from the crankcase into the intake assembly when blowby gas pressure exceeds a predetermined threshold.

One or more nozzles or valves (not shown) may also be provided along the vent line 72, and may be used to provide generally constant flow under various engine operating conditions. As may be appreciated, this system may be adapted for use in various automotive engines, such as turbocharged, supercharged, gasoline, and/or diesel engines. Accordingly, various valve configurations and/or outlets 66 or venting arrangements may be used to ensure that a generally constant air flow passes through the separator 62.

While a large pressure drop across the air-oil separator 62 may be beneficial in promoting effective air-oil separation, this may not be feasible in certain engine designs due to a potentially limited amount of vacuum pressure at the intake manifold 14. As such, it may be desirable to maintain the total pressure drop across the separator 62 to less than about 100 Pascals. As used herein, the pressure drop may be calculated as the difference between the absolute pressure of the gas entering the separator 62 via the inlet 64 and the absolute pressure of the gas leaving through the outlet 66.

Therefore, the present disclosure provides an engine assembly 10 which better separates oil 50 from the crankcase blowby gases 42 in accordance to various embodiments of the present disclosure. In a first non-limiting, example embodiment, the engine assembly 10 includes an engine 12, an intake assembly 13, and an air-oil separator 62. The engine 12 defines a combustion chamber 32 and a crankcase 44. The intake assembly 13 includes an intake manifold 14 wherein the intake manifold 14 is in fluid communication with the combustion chamber 32. The air-oil separator 62 defines an internal passageway 54 having a separator volume 61. An inlet 64 and outlet 66 are defined at each end of the internal passageway 54 of the air-oil separator. The internal passageway 42 of the air-oil separator 62 may be in fluid communication with the crankcase 44 via the inlet 64 while the internal passageway 54 of the air-oil separator 62 may be in fluid communication with the intake manifold 14 via the outlet 66. The air-oil separator 62 further includes a fine separator 76 disposed across the internal passageway 54 (optionally proximate to the inlet 64) wherein the fine separator 76 includes a curved backplate 74 and a front plate 78. The aforementioned curved backplate 74 includes a curved surface 56 which is disposed across from (faces) the front plate 78. The opposite side of the curved backplate 74 which faces away from the front plate 78 may or may not define a curved surface 56. The front plate 78 of the fine separator 76 defines at least one aperture 68 or a plurality of apertures 68 configured to redirect and evenly distribute the blowby gases 42 against the curved surface 56 of the curved backplate 74. Once the blowby gases 42 are directed against the curved surface 56 of the curved backplate 74, the blowby gases 42 flow are then redirected around the curved surface 56 of the curved backplate 74 thus causing oil 50 to separate from the blowby gases 42. The oil 50 which has been separated by the blowby gases 42 may then drain back into the crankcase 44. It is understood that the front plate 78 extends across the internal passageway 54 and the curved backplate 74 may partially extend from an interior surface 80 of the internal passageway 54 into the separator volume 61.

In the aforementioned embodiment, the engine 12 may further include an engine block 20, a cylinder head 22, an oil pan 24, and a cylinder head cover 26 wherein the air oil separator is disposed between the cylinder head 22 and cylinder head cover 26. Moreover, the intake assembly 13 may include a throttle 16 in communication with the intake manifold 14 wherein the throttle 16 is configured to selectively control air flow into the intake manifold 14. The intake assembly 13 may also optionally include an air filter 18 in fluid communication with and located upstream of the throttle 16. Optionally, a breather tube may be fluidly coupled with the intake assembly 13 and with the crankcase 44. The breather tube may be operative to allow air to pass from the intake assembly 13 into the crankcase 44. The aforementioned breather tube may include a check valve operative to restrict air from passing from the crankcase 44 into the intake assembly 13. It is also understood that the internal passageway 54 of the air-oil separator 62 may also optionally include a bypass valve 60 operative to restrict air from passing from the crankcase 44 into the intake assembly 13 when blowby gas pressure exceeds a predetermined threshold. The air-oil separator 62 may also include a baffle at least partially extending from the interior surface 80 of the internal passageway 54 into internal passageway 54. The internal passageway 54 may have a convoluted configuration wherein multiple curved surfaces 57 or bends 57 are formed in the internal passageway 54.

In a second non-limiting, example embodiment of the present disclosure, the engine assembly may include an engine 12, an intake assembly 13, and an air-oil separator. The engine 12 may include an engine block 20, a cylinder head 22, an oil pan 24, and a cylinder head cover 26, the engine block 20 and oil pan 24 partially defining a crankcase 44. The intake assembly 13 may include an intake manifold 14 which may be in fluid communication with the combustion chamber 32. The air-oil separator 62 may be disposed between the cylinder head 22 and cylinder head cover 26. The air-oil separator 62 may define an internal passageway 54 which defines a separator volume 61. The air-oil separator 62 may further include an inlet 64, an outlet 66 and a fine separator 76 disposed across the internal passageway 54 (optionally proximate to the inlet 64) wherein the fine separator 76 is formed by a curved backplate 74 and a front plate 78. Similar to the first embodiment, the curved backplate 74 includes a curved surface 56 which is disposed across from (faces) the front plate 78. The opposite side of the curved backplate 74 which faces away from the front plate 78 may or may not define a curved surface 56. The front plate 78 of the fine separator 76 defines at least one aperture 68 or a plurality of apertures 68 configured to redirect and evenly distribute the blowby gases 42 against the curved surface 56 of the curved backplate 74. Once the blowby gases 42 are directed against the curved surface 56 of the curved backplate 74, the blowby gases 42 flow are then redirected around the curved surface 56 of the curved backplate 74 thus causing oil 50 to separate from the blowby gases 42. The oil 50 which has been separated by the blowby gases 42 may then drain back into the crankcase 44. It is understood that the front plate 78 extends across the internal passageway 54 and the curved backplate 74 may partially extend from an interior surface 80 of the internal passageway 54 into the separator volume 61.

The inlet 64 and outlet 66 are defined at each end of the internal passageway 54 in the air-oil separator 62. The internal passageway 54 of the air-oil separator 62 may be in fluid communication with the crankcase 44 via the inlet 64 while the internal passageway 54 of the air-oil separator 62 may be in fluid communication with the intake manifold 14 via the outlet 66. The aforementioned air-oil separator 62 further includes an oil drain 58 disposed in the internal passageway 54, the oil drain 58 being in fluid communication with the crankcase 44.

With respect to the aforementioned embodiment, a breather tube 45 may be fluidly coupled with the intake assembly 13 and with the crankcase 44. The aforementioned breather tube 45 may be operative to allow air to pass from the intake assembly 13 into the crankcase 44. Moreover, the breather tube 45 may include a check valve operative to restrict air from passing from the crankcase 44 into the intake assembly 13. It is also understood that the internal passageway 54 of the air-oil separator 62 may also optionally include a bypass valve 60 operative to restrict air from passing from the crankcase 44 into the intake assembly 13 when blowby gas pressure exceeds a predetermined threshold. The air-oil separator 62 of the aforementioned embodiment may also optionally include a baffle at least partially extending from the interior surface 80 of the internal passageway 54 into the internal passageway 54.

In a third non-limiting, example embodiment of the present disclosure, a method of separating oil 50 from engine blowby gas includes the steps of: (1) venting blowby gas from the crankcase 44 of an engine 12 and into an air-oil separator 62; (2) flowing the blowby gas into an internal passageway 54 defined by the air-oil separator 62 wherein the blowby gas flows through a fine separator 76 having a curved back plate; and (3) venting the blowby gas from the separator volume 61 into an intake manifold 14 of the engine 12. It is understood that the fine separator 76 may be disposed across the internal passageway 54 may optionally be proximate to the inlet 64 and the fine separator 76 may be formed by a curved backplate 74 and a front plate 78 with an aperture 68 (or a plurality of apertures 68) configured to direct and distribute the blowby gas (or blowby gas flow) against the curved backplate 74. The aforementioned curved backplate 74 includes a curved surface 56 which is disposed across from (faces) the front plate 78. The opposite side of the curved backplate 74 which faces away from the front plate 78 may or may not define a curved surface 56. The front plate 78 of the fine separator 76 defines at least one aperture 68 or a plurality of apertures 68 configured to redirect and evenly distribute the blowby gases 42 against the curved surface 56 of the curved backplate 74. Once the blowby gases 42 are directed against the curved surface 56 of the curved backplate 74, the blowby gases 42 are then redirected around the curved surface 56 of the curved backplate 74 thus causing oil 50 to separate from the blowby gases 42. The oil 50 which has been separated by the blowby gases 42 may then drain back into the crankcase 44. It is understood that the front plate 78 extends across the internal passageway 54 and the curved backplate 74 may partially extend from an interior surface 80 of the internal passageway 54 into the separator volume 61.

Accordingly, the aforementioned step of flowing the blowby gas through an internal passageway 54 includes redirecting the blowby gas through an aperture 68 (or a plurality of apertures 68) defined in the front plate 78 and against a curved backplate 74 wherein the front plate 78 and the curved backplate 74 extend from the interior surface 80 into the separator volume 61. The engine 12 implemented in the aforementioned method an engine block 20, a cylinder head 22, an oil pan 24, and a cylinder head cover 26 wherein the air-oil separator 62 is disposed between the cylinder head 22 and cylinder head cover 26.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An engine assembly comprising: an engine defining a combustion chamber and a crankcase; an intake assembly including an intake manifold, the intake manifold being in fluid communication with the combustion chamber; and an air-oil separator defining an internal passageway having a separator volume and the air-oil separator further defining an inlet and an outlet at each end of the internal passageway, the internal passageway of the air-oil separator being in fluid communication with the crankcase via the inlet, and the internal passageway being in fluid communication with the intake manifold via the outlet; wherein the air-oil separator includes a fine separator disposed across the internal passageway between the inlet and the outlet, the fine separator being formed by a curved backplate having a curved surface and a front plate having a plurality of apertures configured to redirect and evenly distribute a flow of blowby gases against the curved surface of the curved backplate,
wherein the curved surface is disposed across from the front plate.

2. The engine assembly as defined in claim 1, wherein the fine separator is disposed proximate to the inlet of the internal passageway.

3. The engine assembly as defined in claim 2, wherein the engine includes an engine block, a cylinder head, an oil pan, and a cylinder head cover; and wherein the air-oil separator is disposed between the cylinder head and the cylinder head cover.

4. The engine assembly of claim 1, wherein the intake assembly includes a throttle in communication with the intake manifold, the throttle configured to selectively control air flow into the intake manifold.

5. The engine assembly of claim 4, wherein the intake assembly includes an air filter in fluid communication with and located upstream of the throttle.

6. The engine assembly of claim 4, wherein the air-oil separator further includes an oil drain disposed in the internal passageway, the oil drain being in fluid communication with the crankcase.

7. The engine assembly of claim 6, wherein the internal passageway of the air-oil separator includes a bypass valve operative to restrict air from passing from the crankcase into the intake assembly.

8. The engine assembly of claim 7, wherein the air-oil separator includes a baffle extending from an interior surface of the internal passageway at least partially into the separator volume.

9. A method of separating oil from engine blowby gas comprising: venting a blowby gas from a crankcase of an engine and into an air-oil separator;
flowing the blowby gas through an internal passageway of an air-oil separator via an inlet defined by the air-oil separator and through a fine separator having a curved backplate configured to separate oil from the blowby gas;

and venting the blowby gas from the air-oil separator into an intake manifold of the engine via an outlet of the air-oil separator; and wherein the fine separator is disposed across the internal passageway proximate to the inlet and the fine separator being formed by a front plate and the curved backplate having a curved surface disposed across a plurality of apertures defined by the front plate, wherein the method further comprises the step of redirecting and evenly distributing the blowby gases across the curved surface of the curved backplate to separate the oil from the blowby gas using the plurality of apertures.

10. The method of claim 9, wherein step of flowing the blowby gas through the fine separator includes redirecting air through the apertures defined in the front plate and against the curved surface of the curved backplate and wherein the front plate extends across the internal passageway and the curved backplate partially extends from an interior surface of the internal passageway into a separator volume of the internal passageway.

11. The method of claim 9, wherein the engine includes an engine block, a cylinder head, an oil pan, and a cylinder head cover wherein the air-oil separator is disposed between the cylinder head and the cylinder head cover.

12. An engine assembly comprising: an engine including an engine block, a cylinder head, an oil pan, and a cylinder head cover, the engine block and the oil pan partially defining a crankcase; an intake assembly including an intake manifold, the intake manifold being in fluid communication with a combustion chamber of the engine; and an air-oil separator disposed between the cylinder head and the cylinder head cover, the air-oil separator defining an internal passageway with an inlet and an outlet at each end of the internal passageway, the internal passageway of the air-oil separator being in fluid communication with the crankcase via the inlet, and the internal passageway of the air-oil separator being in fluid communication with the intake manifold via the outlet; wherein the air-oil separator includes a fine separator disposed across the internal passageway, the fine separator being formed by a curved backplate and a front plate a plurality apertures configured to redirect and evenly distribute a flow of blowby gases against a curved surface defined by the curved backplate, wherein the curved surface is disposed across from the front plate.

13. The engine assembly of claim 12, wherein the air-oil separator further includes an oil drain disposed in the internal passageway, the oil drain being in fluid communication with the crankcase.

14. The engine assembly of claim 13, wherein the air-oil separator includes a bypass valve operative to restrict air from passing from the crankcase into the intake assembly.

15. The engine assembly of claim 12, wherein the air-oil separator includes a baffle at least partially extending from an interior surface of the internal passageway into the internal passageway.

* * * * *